March 6, 1956  A. W. RICHARDS ET AL  2,737,213
BELT-DRIVEN HAND SAW WITH INCREASED BELT FRICTION
Original Filed Feb. 2, 1950  4 Sheets-Sheet 1

INVENTORS.
ARCHER W. RICHARDS
BY ERVIN J. OSTERHUS
William D. Carothers
THEIR ATTORNEY March 6, 1956  A. W. RICHARDS ET AL  2,737,213
BELT-DRIVEN HAND SAW WITH INCREASED BELT FRICTION
Original Filed Feb. 2, 1950  4 Sheets-Sheet 2
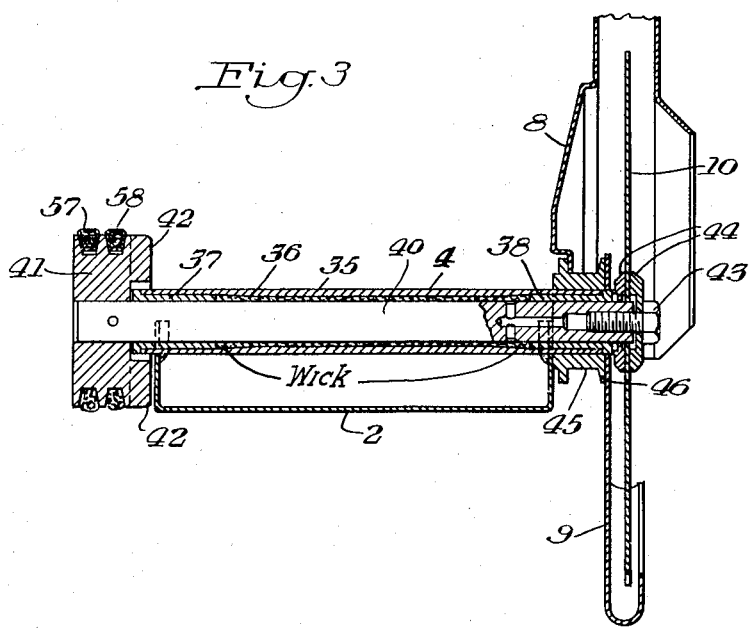
INVENTORS.
ARCHER W. RICHARDS
BY ERVIN J. OSTERHUS
William D. Carothers
THEIR ATTY.

March 6, 1956     A. W. RICHARDS ET AL     2,737,213
BELT-DRIVEN HAND SAW WITH INCREASED BELT FRICTION
Original Filed Feb. 2, 1950     4 Sheets-Sheet 3
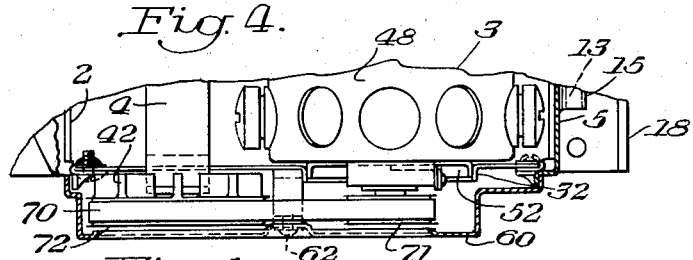
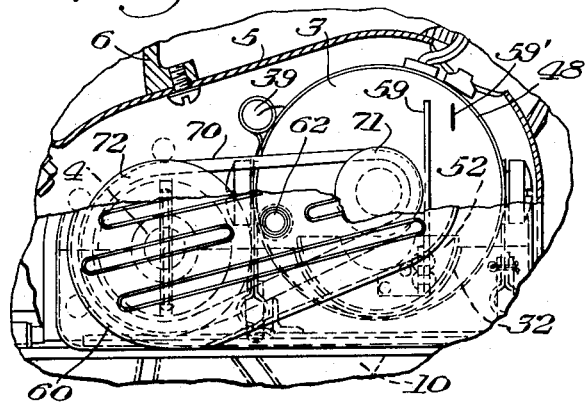
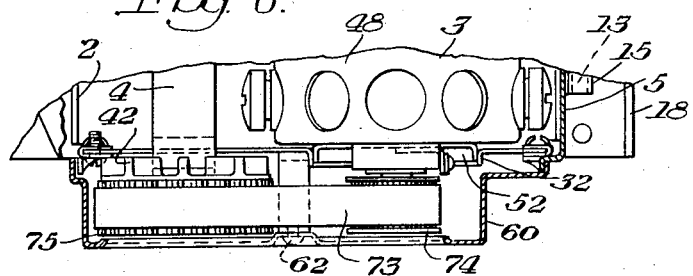
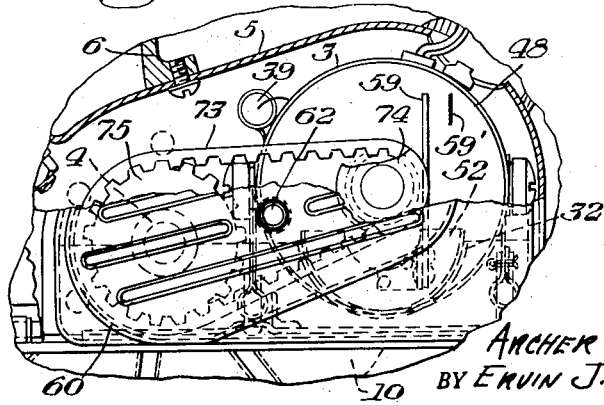
INVENTORS.
ARCHER W. RICHARDS
BY ERVIN J. OSTERHUS
THEIR ATTORNEY

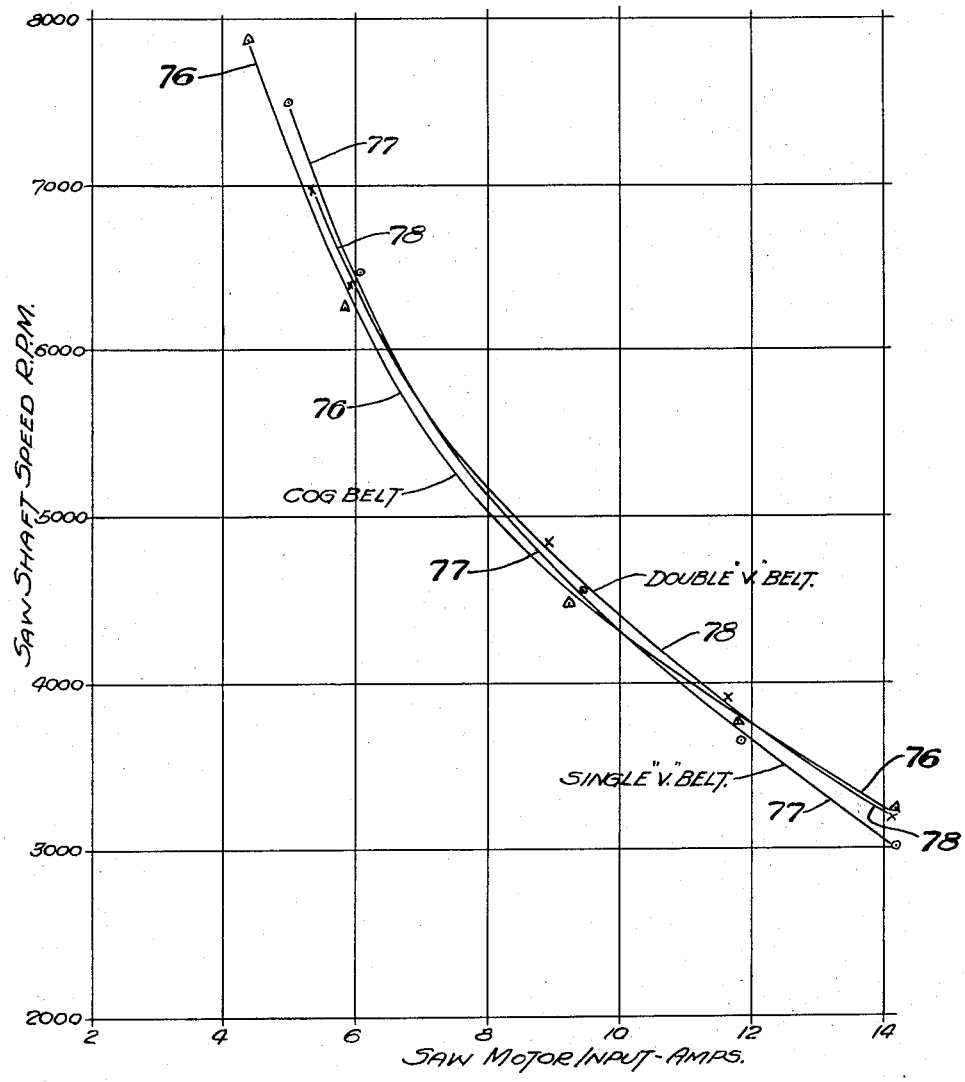

United States Patent Office 2,737,213
Patented Mar. 6, 1956

2,737,213

BELT-DRIVEN HAND SAW WITH INCREASED BELT FRICTION

Archer W. Richards, Chagrin Falls, and Ervin J. Osterhus, Cleveland, Ohio, assignors to Syntron Company, Homer City, Pa., a corporation of Delaware Original application February 2, 1950, Serial No. 142,066, now Patent No. 2,671,476, dated March 9, 1954. Divided and this application February 6, 1953, Serial No. 335,524

7 Claims. (Cl. 143—43)

This invention relates generally to motor operated portable hand saws, and more particularly to belt-driven hand saws.

This invention is a division of application Serial No. 142,066 filed February 2, 1950, for Portable Belt-Driven Power Hand Saw, issued March 9, 1954, as Pat. No. 2,671,476.

Motor operated belt-driven hand saws have been suggested in the art as disclosed in Wertz, 1,663,486, of March 20, 1928, yet this saw was not successful commercially probably owing to the impracticability of its structure and design. It is obviously too heavy and bulky and difficult to manipulate. The center of mass is not properly located relative to the handle. It shows an induction motor the speed of which is less than that of the saw requiring a step-up transmission. A gear-driven motor hand saw was much smaller and very neat in design. The gear saw became very popular, yet the gears wear out in a relatively short time and they are quite noisy.

The motor operated belt-driven hand saw comprising this invention provides a higher speed series motor that is light in weight and readily manipulatable. The speed is reduced to the saw which is quiet and efficient in its operation. The structure of this novel hand saw permits it to cut in a plane disposed angular to the surface of the board being cut. The base of this saw may also be adjusted to determine the depth of the saw cut, all of which makes this hand saw less dangerous to handle.

This compact belt-driven hand saw provides a long lubricant-packed shaft with the saw blade on one end and a grooved pulley on the other end for using a V-belt to drive the saw. One or two V-belts may be employed to increase the no load friction and reduce the no load speed but increase the load transmission. When one V-belt is employed, the belt should run below the periphery of the grooves in the pulley. When using two belts, the grooves may be shallow or deep. These structural features provide long life with durability and permit the transmission of adequate power to the saw blade for properly performing its work. The gear type drive is inadequate for the transmission of power, particularly at light loads it soon wears out.

This belt-driven hand saw is provided with spaced cradle sockets for supporting the motor. The surfaces on the motor which are received in the cradle sockets are eccentric to its rotary shaft. The motor is thus pivoted relative to the base and a slight movement of the motor housing increases or decreases the distance between the motor shaft and the blade shaft to enable one to adjust the tension on the belt drive before clamping the motor to the base. A spring having a predetermined resistance to flexure is fastened to the motor and when pushed until it points to a given mark it tightens the belt means to a predetermined degree. This provides a constant tension on the belt means and it may always be uniformly measured and adjusted regardless of wear of the parts.

Another structural characteristic of this belt-driven hand saw is the disposition of the handle relative to the center of mass. The motor shaft and the saw blade shaft are parallel and the handle is above, placing the hand over the power shaft and the motor. This arrangement properly distributes the weight of the tool making it very easily handled and manipulated.

Another object is the provision of a belt-driven hand saw wherein the motor and saw shafts are parallel and close together making a compact tool.

Another object of this invention is the provision of a simple structure that is economical to manufacture. The tool base and the wood engaging surface together with the several parts of the housing are simple structures readily assembled and may be die castings or stampings. The motor being mounted under the housing, needs no heavy exterior shell. It is in the form of two deeply drawn cups or castings having sockets for receiving the shaft bearings and the arcuate eccentric supporting surfaces may be welded or cast on the ends of these cups. The motor is held by a strap or screw lock which may be loosened to shift the motor and tighten the belt.

Spaced bearings in the long sleeve are employed to rotatably support the power shaft. The space between the bearings may be packed and oiled through the power shaft, and thus be sealed off by the screw holding the saw on the shaft. The long sleeve between the bearings adds many more hours of life to the saw as it properly resists lateral shock such as experienced when the saw first engages the material it is to cut or a hard spot during the cutting thereof.

Other objects and advantages appear in the following description and claims.

The accompanying drawings show, for the purpose of exemplification without limiting the invention or claims thereto, certain practical embodiments of the invention, wherein:

Fig. 3 is a sectional view of the saw and its arbor;

Fig. 4 is a view in horizontal section of a single belt drive with parts being broken away;

Fig. 5 is a view in vertical section of the structure shown in Fig. 4;

Fig. 6 is a view in horizontal section of a single cog belt drive with parts being broken away;

Fig. 7 is a view in vertical section of the structure shown in Fig. 6; and

Fig. 8 is a graph of the speed v. current load for the three types of belt transmission, single V-belt, double V-belt and cog belt.

Figure 1:
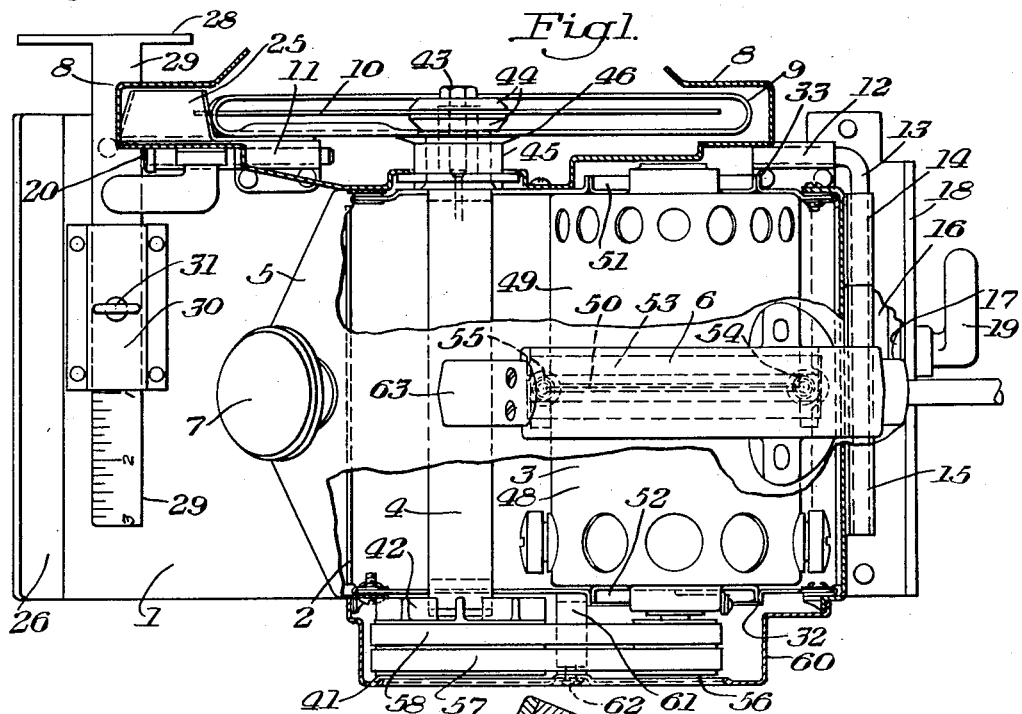
Fig. 1 is a plan view of the belt-driven hand saw comprising this invention.
Figure 2:
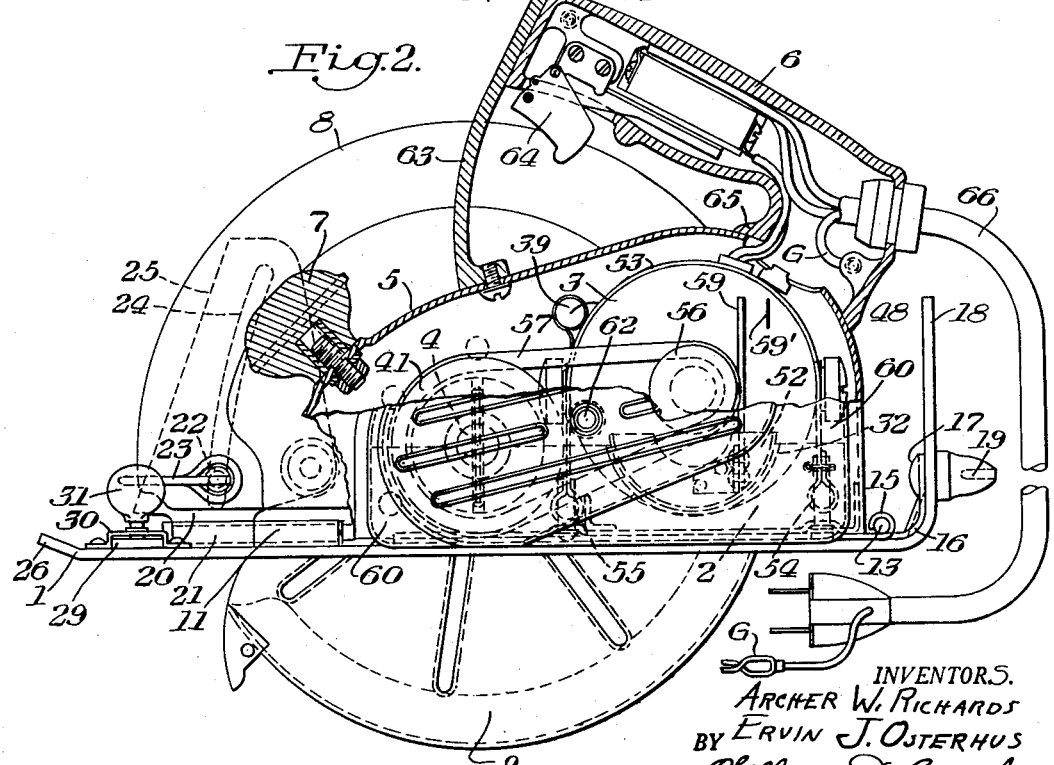
Fig. 2 is a view in side elevation of the structure shown in Fig. 1.

Referring to the drawings, it will be noted that the hand saw comprising this invention is made up of an adjustable base 1 which is hingedly attached to the frame member 2 that supports the high speed series motor 3 and the saw shaft 4. The frame member 2 also has the housing 5 attached thereto which is provided with the grip handle 6 and the hand knob 7 and is also arranged to carry the upper fixed shield 8 and the lower adjustable shield 9 for the saw blade 10. The grip handle 6 has a front support guard 63.

The adjustable saw base 1 is provided with the aligned hinged sockets 11 and 12 for receiving the one leg of the hinge pin 13. The other leg of the hinge pin 13 is pivotally retained in the aligned hinge sockets 14 and 15 which are welded to the rear end of the frame 2. In view of the fact that the single hinge pin 13 has two legs disposed at 90° to each other and since the hinge sockets 11 and 12 are secured to the base 1, it is obvious that the outer end of the base 1 may be swung on the axes of the sockets 11 and 12 toward and away from the frame 2 to provide a relative angular position of the saw blade to the under surface of the base 1. The saw has to be turned in the proper direction to determine the direction of this outer cut relative to a plane normal to the underside of the base 1.

On the other hand, it is also noted that the front end of the base 1 may be swung toward and away from the frame 2 as the base is also pivoted on the other leg of the pin 13 that lies in the hinge sockets 14 and 15. With this adjustment the forepart of the base 1 is moved toward and away from the saw and the rear part is held by the hinge pin in a fixed pivoted position relative to the saw. If the base 1 is close to the underside of the frame 2 it will be parallel therewith and the front end may be moved toward or away from the shaft 4 carrying the saw 10, thereby providing different depths of cut for the saw blade 10. Both the angular and depth adjustment of the base 1 may be made simultaneously relative to the saw blade.

A member 16 is pivotally hinged on the hinge pin 13 intermediate of the sockets 14 and 15 and extends upwardly to support the clamping bolt 17 which rides through the arcuate slot in the arcuate gauge plate 18 which is provided with numerals indicating the angular degree of the underface of the base plate 1 relative to the saw. The bolt 17 is held in any desired position in its arcuate slot by means of the winged clamping nut 19. The center of radius of the arcuate slot is of course taken from the axis of the sockets 11 and 12.

A member 20 is provided with a socket 21 for receiving the outer end of the hinge pin 13 adjacent the socket 11. The member 20 extends upwardly to receive the bolt 22 that is clamped in place by means of the nut 23. The bolt 22 is adjustable along the slot 24 in the gauge plate 25 which is supported integrally relative to the housing 5 and the arcuate slot 24 has for its center of radius the axis of the sockets 14 and 15 secured to the end of the frame 2. Thus, when the base is pivoted on the axis of the sockets 14 and 15 and the front end swings downwardly to determine the depth of the sawcut, it may be clamped in any desired position along the slot 24 so as to properly gauge the saw relative to the undersurface of the base plate 1.

The extreme front end of the base plate 1 is turned upwardly to form a lip 26 which permits the base to be slid over the wood or a series of boards that might be rough or otherwise uneven in sawing the same, such as sawing off the ends of the roof boards that project beyond the eave of a house. A lateral guage 28 is secured to a stem 29 that is marked as a scale and slides through the socket 30 and may be secured by the set screw 31. The relative position of the gauge 28 and the saw blade 10 may be set by shifting the stem 29 to a desired position and clamping the same by means of the clamping screw 31 in the socket 30.

The parallel cradle surfaces are arranged to receive the tube 35 which is shown in detail in Fig. 3 and contains two bearing sleeve sections 37 and 38. Intermediate the bearing sleeves 37 and 38 an annular oil wick 36 is inserted and may be supplied with oil through the axial and radial passages by removing the saw blade mounting screw 43 which also closes the oil reservoir formed by the axial and radial passages in the shaft 4. The bearing sleeves 37 and 38 have flanges which cover the ends of the tube 35. The saw shaft 4 is arranged to rotate in the composite bearing sleeve mounted in the tube 35. A double grooved pulley 41 is secured to one end of the shaft 4 and a series of fan blades 42 are on the inner face of the pulley for the purpose of creating a draft to circulate air from the left side of the housing 5 toward the saw to cool the pulley and prevent the deposit of sawdust within the housing. The fan prevents quiescence in the housing and any time that sawdust tends to creep in it provides circulation for discharging the same. In this manner the motor and other parts are kept clear of sawdust, yet they are not sealed in and are cooler in operation.

The opposite end of the shaft 4 has the saw blade 10 secured thereto by means of the nut 43, the blade being held between the washers 44. It will be noted that the tube 35 extends beyond the upwardly extending wall of the base 2 for the purpose of functioning to receive the bearing sleeve 45 to which is journaled the cover 8. The outer end of the bearing sleeve 45 has the movable shield 9 secured thereto, as indicated at 46, and is permitted to rotate about the axis of the saw. This shield is provided with a spring, to keep the shield 9 in its fully extended position.

The motor 3 is a universal motor being series wound and operating at a speed of approximately twelve thousand R. P. M. It is encased in two cup-like housings, three and three-fourths inches in diameter, as shown at 48 and 49, which are shoved over the ends of the motor field and are provided with flanges that come together, as indicated at 50. Each cup-shaped housing is provided with an arcuate supporting surface, as shown at 51 and 52, which are arranged to rest in the cradles 33 and 32, respectively, of the base 2. A strap member 53 is secured at one end to the base 2, as shown at 54, and extends over the flanges 50, and is also adjustably secured at its other end to the base 2, as indicated at 55, for the purpose of tightly clamping the motor down to the base 2. The motor 3 has a condenser 39 to check radio interference and is likewise provided with a double-grooved pulley 56 approximately one and one-quarter inch in diameter for receiving the belt members 57 and 58 that extend from the motor pulley to the saw pulley 41 which is approximately two and one-half inches in diameter which provides approximately 12,000 surface feet per minute for an eight inch saw blade. The arcuate supporting surfaces 51 and 52 are eccentric to the shaft of the motor end, thus, any relative arcuate adjustment of the motor will determine the tension on the belts 57 and 58. It is necessary for one to remove the cover 5 and loosen the strap 53 and shove against the spring 59 until it aligns with the mark 59′ to rotate the motor to a position where the tension on the belt is proper and in accordance with the pressure of the flexed springs and then reclamped. This uniform tension on the belts may be made when the motor is stationary or operating the saw. These mating arcuate cradle surfaces may be knurled or roughened to prevent the motor from slipping from its adjusted position.

The principal housing 5 encases the whole of the motor and the majority of the tube carrying the shaft 4 and has attached thereto the separate housing 60 which encloses the belts. The housing 60 joins the housing 5 to lock the latter in position and it is supported by the bracket 61 which is welded to the base 2. The housing 60 is held in place by the bolt 62, as shown in Fig. 1.

The grip handle 6 contains the electric switch actuated by the finger trigger 64. It will be noted that the butt end 65 of the handle is attached to the rear of the housing 5 above end to the rear of the motor 3; whereas the knob handle 7 is secured to the front of the housing ahead of the sleeve 4. This disposition of the handles properly places the center of mass between the handles 6 and 7 thereby permitting the operator to readily manipulate the saw. The wires coming from the current supply in the cable 66 pass into the handle 6 to the switch and thence back to the motor 3. It will be noted that the switch is a double pole switch and both lines are open when the saw is turned on. A third wire in the cable may be used to ground the saw. The cable 66 is provided with a ground wire that is connected to the inside of the handle below the rubber cable bushing and may have a ground clip at its other end.

The saw shaft 4 is parallel to and very close to the shaft of the motor 3 to concentrate the weight directly under the handle 6. This provides a very compact saw with these shafts as close as the size of the pulleys permit without requiring more than two belts. In the structure shown the motor 3 may be adjusted on the arcuate bearing surfaces so that the axes of the saw shaft and motor shafts are from three and one-quarter to three and five-eighths inches apart. This provides three-eighths inch for wear and belt adjustment. The saw shaft housing 35 may be spaced from the motor casing 48, 49 as little as two and three-eighths inches to as much as four and one-half inches since the tubing 35 is approximately one inch in outside diameter; whereas the casing 48, 49 is three and three-quarter inches and the pulleys have a ratio of approximately two and one-half to one. These dimensions provide important factors in the makeup of this belt type portable saw.

In Figs. 4 and 5, a single V-belt 70 is used to transmit power from the motor 3 by the single deep grooved pulleys 71 and 72 on the series motor and saw shafts respectively. The saw shaft pulley 72 has the cooling fan 42 on its inner face to dissipate the frictional heat developed by the belt 70 running in the deep grooves.

In Figs. 6 and 7 a single cog belt 73 is used to transmit power from the motor to the saw shafts. A cog pulley 74 is provided on the motor shaft and a cog wheel 75 is provided on the saw shaft.

In the transmission of power the cog belt has little or no friction losses as compared to the deep grooved pulley single belt drive or double grooved double belt drive, yet all three drives provide smooth operation under load with a cushioning effect between the high torque series motor and the saw blade. It is also possible to use greater pulley ratios and a higher speed motor with the same diameter saw because there is no slippage with a cog belt. A smaller driving pulley and closer centers between the saws and motor shafts may be used with a cog belt which would be impossible with V-belts. However, there are limitations such as the top no-load speed of a saw. A saw blade has a critical no-load speed at which it will flutter and vibrate. This action will probably result in fatigue and cracking. The no-load high speed flutter also causes a rough cutting at the start of the saw stroke which is decidedly undesirable. A saw blade eight and one-half inches in diameter, which is employed on the saws disclosed herein, has a critical flutter at no-load with speed of 7,200 R. P. M. and a definite flutter at 7,400 R. P. M.

The performance curves shown in Fig. 8 illustrate the different speeds attained for different loads from no-load to full-load. Curve 76 is the cog belt drive, 77 the deep grooved single V-belt drive and 78 the double V-belt drive. It will be noted that for the same series motor and diameter of pulleys the cog belt drive provides a much higher no-load speed. This is due to the fact that there is no slip and the speed is away above the flutter speed. In order to use this cog belt drive, it would be necessary to increase the pulley ratios and lower the no-load speed.

The deep groove single V-belt drive also has a higher no-load speed because the transmission losses are not high and to use this transmission the pulley ratios would likewise have to be increased to bring the no-load speed down. There is a limit to the size of the pulleys that can be employed. When the driving pulley cannot be made any smaller and the driven pulley cannot be made any larger without raising the saw shaft higher from the base plate, then the depth of cut has to be sacrificed. If a larger diameter saw is required, then a more powerful motor is necessary thereby increasing the weight of the saw.

To avoid these difficulties the deep groove single V-belt and the double V-belt drive provides the answer. This is shown by the curve 78. At no-load the efficiency is poor and the best speed attainable for the same motor and the eight and one-half inch saw blade is approximately 6,900 R. P. M. which is below the critical flutter speed. However, at a load greater than normal full load, the transmission is substantially as efficient as the cog belt. Normal load is about ten amperes on these performance curves.

We claim:

1. A hand manipulated power saw comprising a base carrying a motor support and bearing means the axes of which are parallel with each mounted close to the base and to each other, a high speed motor adjustably clamped on said motor support, a rotary power shaft carrying a saw and rotatably supported by said bearing means, pulley means secured to said motor and to said power shaft and having aligned belt grooves with a small pulley on the motor and a large pulley on said power shaft, and belt means connecting said grooves, the grooves of said large and small pulleys having increased area of contact with the belt means to increase the no-load friction for reducing the no-load speed of the saw and for increasing the load transmission.

2. The structure of claim 1 characterized in that the belt means is a single V-belt and said belt grooves are deeper than the depth of the V-belt.

3. The structure of claim 1 characterized in that said belt grooves are two in number for each pulley and the belt means are two in number.

4. The structure of claim 1 characterized in that said bearing means comprises spaced aligned bearings with an enclosed intermediate space that is connected to the exterior through a passage in said power shaft, which passage is closed by a screw attaching the saw to said power shaft.

5. The structure of claim 1 which also includes a spring attached to said motor and having a predetermined resistance to flexure and to be flexed in the direction away from said power shaft to move said motor on said support to tighten said belt means to a predetermined tension indicated by the flexed spring reaching a mark fixed with respect to the motor.

6. A circular power saw comprising a base, a motor member mounted on said base and having a grooved belt pulley, a rotary power shaft member with a saw and a grooved belt pulley and mounted on said base with the pulley grooves in alignment, belt means connecting said grooves, the mounting of one of said members being adjustable to move said one member toward and away from the other member to tighten said belt means, and a spring attached to said movable member and having a predetermined resistance to flexure and to be flexed in the direction away from said other member to tighten said belt means to a predetermined tension indicated by the flexed spring reaching a mark fixed with respect to said adjustable member.

7. The structure of claim 6 characterized in that said spring means is attached to said movable member adjacent to said belt drive.

References Cited in the file of this patent

UNITED STATES PATENTS

| | | |
|---|---|---|
| 561,028 | Perry | May 26, 1896 |
| 1,168,139 | Young | Jan. 11, 1916 |
| 1,396,966 | Lyon et al. | Nov. 15, 1921 |
| 1,464,351 | Casey | Aug. 7, 1923 |
| 1,568,328 | French | Jan. 5, 1926 |
| 1,663,486 | Wertz | Mar. 20, 1928 |
| 1,848,330 | Emmons | Mar. 8, 1932 |
| 2,357,953 | James | Sept. 12, 1944 |
| 2,381,489 | Dietz | Aug. 7, 1945 |
| 2,488,947 | Vavrik | Nov. 22, 1949 |